United States Patent [19]

Slonneger

[11] Patent Number: 4,875,466
[45] Date of Patent: Oct. 24, 1989

[54] SOLAR HEATING DISC

[76] Inventor: Stephen Slonneger, 13176 Fenton, Sylmar, Calif. 91342

[21] Appl. No.: 265,336

[22] Filed: Oct. 24, 1988

Related U.S. Application Data

[63] Continuation-in-part of Ser. No. 97,172, Sep. 16, 1987, abandoned.

[51] Int. Cl.⁴ .............................................. F24J 3/02
[52] U.S. Cl. ..................... 126/415; 126/416; 126/417; 4/493; 4/498
[58] Field of Search ................. 126/415, 416, 417; 4/493, 498

[56] References Cited

U.S. PATENT DOCUMENTS

| | | | |
|---|---|---|---|
| 3,984,881 | 10/1976 | Gerlach | 126/415 |
| 3,984,882 | 10/1976 | Forman et al. | 126/415 |
| 4,090,496 | 5/1978 | Mallet | 126/415 |
| 4,146,015 | 3/1979 | Acker | 126/415 |
| 4,222,366 | 9/1980 | Acker | 126/415 |
| 4,366,806 | 1/1983 | Acker | 126/415 |

FOREIGN PATENT DOCUMENTS 994106  8/1951  France .................. 126/415

Primary Examiner—Larry Jones
Attorney, Agent, or Firm—Rapkin, Gitlin, Moser & Schwartz

[57] ABSTRACT

A dome-shaped device usually four to five feet in diameter with a continuous channel section formed integrally around its perimeter. The device is of a unitary construction and is typically formed of a synthetic substance, such as polyethylene. The unique design of the device and particularly the density of the material comprising the device, enables it to be submersed just below the surface of the water to achieve a maximum stability. The unitary construction serves also to optimize the conduction process that is involved in the transfer of the solar energy through the walls of the device to heat the surrounding pool water. The channel section formed around the periphery of the device acts, in part, as a stabilizer to preclude against undesirable movements and sustain the degree of buoyancy necessary to maintain the unit in a submersed attitude without restricting its ability to freely bob up and down in the water. The channel section is also effective as a bumper for preventing one disc from slipping underneath another and, ultimately, interfering with the function of both. The device also includes a means for easy deployment and removal from the pool.

2 Claims, 2 Drawing Sheets

SOLAR HEATING DISC

This application is a continuation-in-part of Ser. No. 097,172, filed Sept. 16, 1987, now abandoned.

FIELD OF THE INVENTION

This invention relates generally to the field of solar heating apparatus and more particularly to an improved device for transferring the heat radiating from solar energy to a body of water.

DESCRIPTION OF THE PRIOR ART

The present invention is a distinct improvement over the prior art by virtue of its simplicity and extreme efficacy resulting from its unique design, size unitary construction and material composition. The present invention provides a device that is simple in design, light weight, appropriately buoyant, unitary in construction, and extremely effective in its ability to increase and maintain the temperature of the pool water utilizing only a relatively few units in the process.

For example, most pool covers are usually very cumbersome and, therefore, difficult to deploy and remove. Covers can also be extremely dangerous should someone, such as a small child, be caught underneath and unable to free himself. Covers also attract and accumulate a great deal of debris, such as leaves and dirt, which are often swept into the pool either in the course of the cover's deployment or upon its removal. Many pool covers, particularly those that are manually operated and commonly folded and stored somewhere near the pool or decking, are often unsightly in appearance. Efforts to resolve these drawbacks have resulted in the development of the devices disclosed in several U.S. Patents, including U.S. Pat. Nos. 3,984,881 and 3,984,882, which disclose solar panels of a relatively complex construction that are designed to float on the water's surface. U.S. Pat. No. 4,022,187 discloses a panel unit which is comprised of several parts and is also designed to float on the water's surface. The unit disclosed in U.S. Pat. No. 4,146,015 is even more complex than the others mentioned as it comprises a floating membrane and a partially submerged support device formed around the membrane's perimeter.

The present invention is a distinct improvement over the prior art by virtue of its simplicity and extreme efficacy resulting from its unique design, size and unitary construction. The present invention provides a device that is simple in design, light weight, unitary in construction, and extremely effective in its ability to increase and maintain the temperature of the pool water utilizing only a relatively few units in the process. The invention is also aesthetically pleasing in appearance, easy to deploy and remove from the pool, and stackable for purposes of storage. It has additional advantages in that it may remain deployed in the pool without risking interference with the functional objectives of a pool sweep, skimmer or similar cleaning device.

The advantages and distinctions of the present invention over the prior art will become clearly evident in the following disclosure.

SUMMARY OF THE INVENTION

The present invention in its preferred embodiment comprises a dome-shaped device usually four to five feet in diameter with a continuous channel section formed integrally around its perimeter. The device is of a unitary construction and is typically formed of a synthetic substance, such as polyethylene.

The unique design of the device and particularly, the density of the material comprising the device, enables it to be submersed just below the surface of the water to achieve a maximum stability. The unitary construction serves to optimize the conduction process that is involved in the transfer of the solar energy through the walls of the device to heat the surrounding pool water.

The channel section formed around the periphery of the device acts, in part, as a stabilizer to preclude against undesirable movements and sustain the degree of buoyancy necessary to maintain the unit in a submersed attitude without restricting its ability to freely bob up and down in the water. The channel section is also effective as a bumper for preventing one disc from slipping underneath another and, ultimately, interfering with the function of both. The device also includes a means for easy deployment and removal from the pool.

Accordingly, an object of the present invention is to provide a solar heating disc that is entirely submersible.

Another object of the present invention is to provide a solar heating disc that is self-stabilizing.

Another object of the present invention is to provide a solar heating disc that is of a unitary construction and specific density to enable the maintenance of a desired buoyancy.

Still another object of the present invention is to provide a solar heating disc that may easily be deployed and removed from the pool.

Still another object of the present invention is to provide a solar heating disc that is capable of maintaining a desired degree of buoyancy while it bobs up and down relative to the water's surface.

Yet still another object of the present invention is to provide a solar heating disc that is easily stackable for storage.

Still another object of the present invention is to provide a solar heating disc that does not interfere with the function of a pool skimmer or independent pool cleaning apparatus.

Still yet another object of the present invention is to provide a solar heating disc that is convenient and easy to use and inexpensive to manufacture.

Other objects and advantages of the present invention will become apparent in the following specifications when considered in light of the attached drawings wherein a preferred embodiment of the invention is illustrated.

A BRIEF DESCRIPTION OF THE DRAWINGS

DETAILED DESCRIPTION OF THE PREFERRED EMBODIMENT

Figure 1:
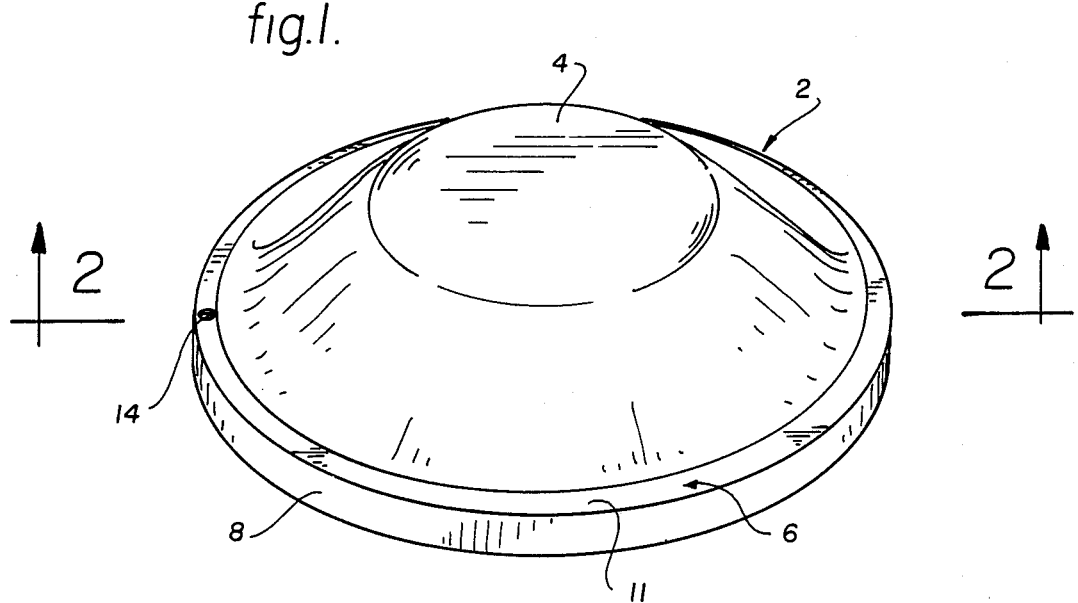
FIG. 1 is an enlarged perspective view of a solar heating disc in accordance with the present invention.
Figure 2:
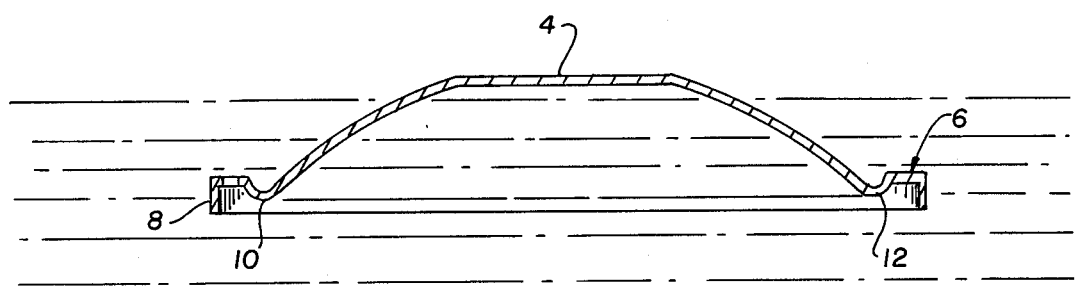
FIG. 2 is a transverse cross-sectional view of the solar heating disc in accordance with the present invention taken in the direction of arrows 2—2 of FIG. 1; and, FIG. 3 is a perspective view of a swimming pool in which a plurality of the solar heating discs in accordance with the present invention are deployed.
Figure 3:
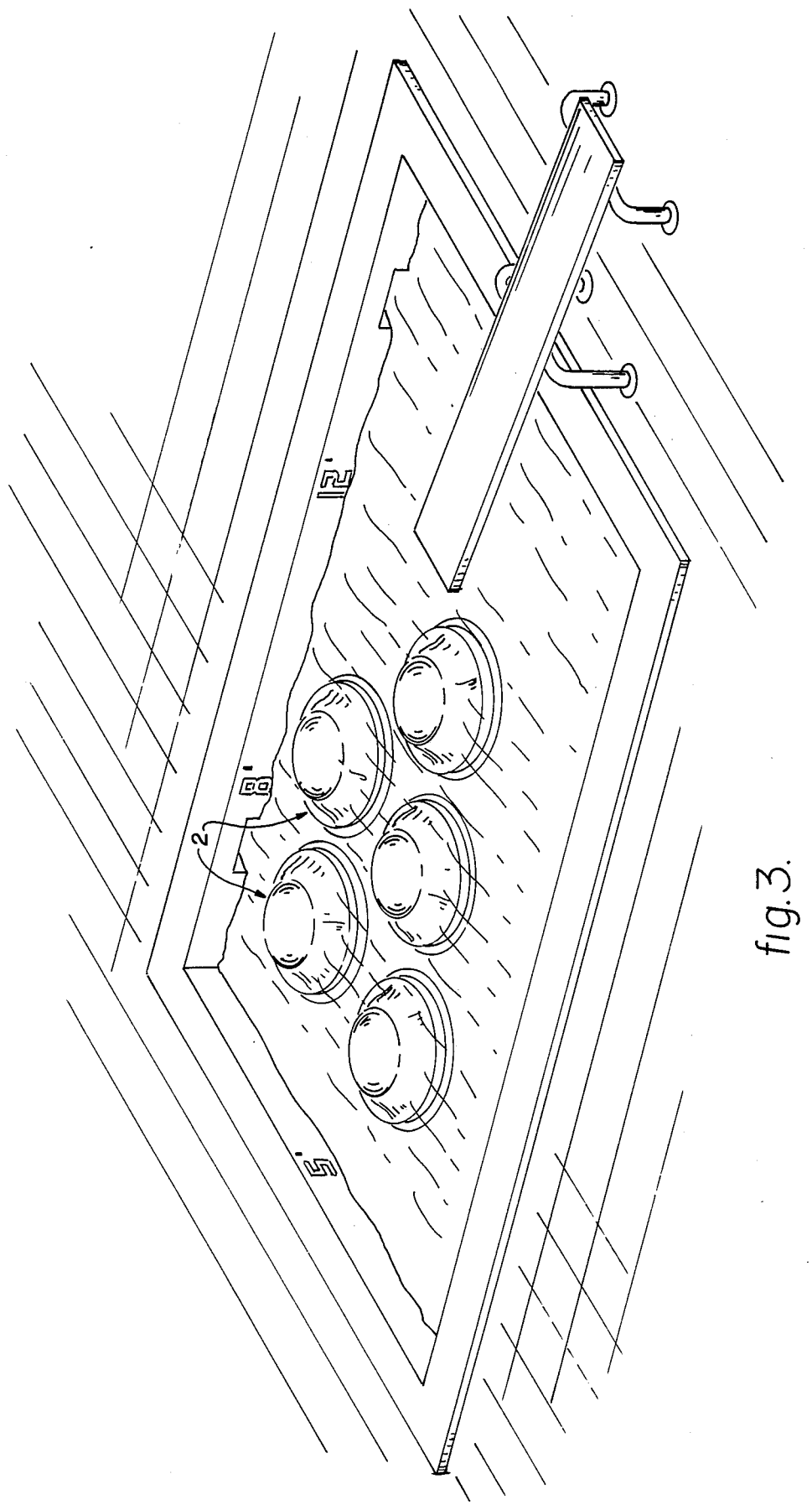

Referring more particularly to the drawings, FIG. 1 is an enlarged perspective view of the solar heating disc 2 in accordance with the present invention. Disc 2 is designed in the shape of a dome with an apex 4 and a channel section 6 formed integrally with the perimeter of disc 2. Channel section 6 includes side walls 8 and 10, an upper wall 11 in connecting the two, and a channel 12 defined by the formation of all three. Channel 12 includes a continuous channel or opening which faces the pool bottom when disc 2 is properly deployed in the water. In addition to its role as a stabilizing element, channel 12 also acts as a bumper to preclude one unit from slipping underneath another and against the eventual disabling of both. Disc 2 is generally unitary in construction, which characteristic acts to minimize the drawbacks usually associated with solar heating devices comprised of a plurality of parts.

An example is the inefficient heat transfer that normally occurs when the conduction or even the convection process is interrupted by the use of a plurality of juxtaposed elements and/or air spaces. Unitary structures normally do not experience these kinds of problems. Polyethylene is the preferred material for the construction of disc 2 because of the density of the material. The density range of the polyethylene is 0.9202-0.9500 grams per cubic centimeter giving the device its unique buoyancy and stabilization characteristics. Due to its novel design and material composition and density, disc 2 is submersible just below the water's surface, though not so far below the water line that the solar energy may not efficiently be transmitted to effect the adequate heating of the pool.

The combined characteristics of the design of disc 2 and the density of the material that is used for its construction make it possible for the unit to bob up and down in the water to a limited extent.

The combined characteristics of the design of disc 2 and the specific density of the material that is used in its construction combined to purposely restrict the distance the unit bobs up and down in the water. In this manner, the apex 4 and the area immediately adjacent are exposed to the sun's concentrated rays which, in turn, are radiated through disc 2 to more efficiently heat the surrounding water. A plurality of discs 2 may be deployed in the pool by means of any conventional device that is capable of grasping an opening 14, such as a hook attached to the end of a telescopic pole. The discs may also be deployed and removed by hand, though this method is obviously less effective and more difficult than the means already described.

While the invention will be described in connection with a certain preferred embodiment it is to be understood that it is not intended to limit the invention to that particular embodiment. Rather, it is intended to cover all alternatives, modification and equivalents as may be included within the spirit and scope of the invention as defined by the appended claims.

I claim:

1. A submersible solar heating apparatus for a unitary construction, including:

a. A dome-shaped unitary construction device comprised of polyethylene having a specific density ranging from 0.9202 to 0.9500 grams per cubic centimeter for collecting and transmitting through its mass solar energy for heating the water adjacent to said device, said device adapted to be deployed in the water so that a substantial portion thereof is immersed in the water and only the apex portion of said device is maintained above the water's surface; and, b. a channel section integrally formed with and along the periphery of said device to stabilize said device in the water.

2. Multiple units as defined in claim 1, said units being stackable one on top of the other for storage.

* * * * *